United States Patent
Chang et al.

(10) Patent No.: US 8,535,601 B2
(45) Date of Patent: Sep. 17, 2013

(54) COMPOSITE TARGET MATERIAL AND METHOD FOR PRODUCING THE SAME

(75) Inventors: Hsin-Pei Chang, Tu-Cheng (TW);
Wen-Rong Chen, Tu-Cheng (TW);
Huann-Wu Chiang, Tu-Cheng (TW);
Cheng-Shi Chen, Tu-Cheng (TW); Jia Huang, Shenzhen (CN)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 160 days.

(21) Appl. No.: 13/094,983

(22) Filed: Apr. 27, 2011

(65) Prior Publication Data
US 2012/0024699 A1 Feb. 2, 2012

(30) Foreign Application Priority Data
Jul. 28, 2010 (CN) .......................... 2010 1 0239239

(51) Int. Cl.
*B28B 3/00* (2006.01)

(52) U.S. Cl.
USPC .................. 264/660; 204/298.13; 501/134

(58) Field of Classification Search
None
See application file for complete search history.

(56) References Cited

U.S. PATENT DOCUMENTS

| 4,482,642 A * | 11/1984 | Ettlinger et al. ............. 502/232 |
| 6,387,318 B1 * | 5/2002 | Xue et al. .................... 264/642 |
| 2007/0169453 A1 * | 7/2007 | Hayakawa ..................... 55/523 |
| 2007/0224110 A1 * | 9/2007 | Fukuda et al. ................ 423/598 |
| 2008/0274351 A1 * | 11/2008 | Itoh et al. ...................... 428/337 |
| 2010/0096783 A1 * | 4/2010 | Tokudome et al. ........... 264/630 |
| 2012/0220445 A1 * | 8/2012 | Uoe et al. ...................... 501/134 |

FOREIGN PATENT DOCUMENTS

| JP | 10330169 A | * 12/1998 |
| JP | 2006111674 A | * 4/2006 |
| WO | WO 2011027904 A1 | * 3/2011 |

OTHER PUBLICATIONS

Kuo et al., "Growth and properties of titania and aluminum titanate thin films obtained by r.f. magnetron sputtering", Thin Solid Films 460, pp. 327-334, 2004.*
Gonzalez et al. ("Low-Temperature Compaction of Nanosize Powders", "Nanostructured Materials and Nanotechnology" by Nalwa, copyright 2000, p. 93).*
Bueno et al., "Sintering and mass transport features of (Sn,Ti)O2 polycrystalline ceramics",J. Euro. Ceram. Soc., pp. 887-896, 2003.*
Jean et al., "Low-Fire Processing of ZrO2-SnO2-TiO2 Ceramics", J. Am. Ceram. Soc., pp. 1417-1422, 2000.*

* cited by examiner

*Primary Examiner* — Matthew Daniels
*Assistant Examiner* — Lisa Herring
(74) *Attorney, Agent, or Firm* — Altis & Wispro Law Group, Inc.

(57) ABSTRACT

A composite target material includes titanium oxide in a range between about 50 wt % and about 85 wt % and the remaining comprising stannic oxide or aluminum oxide or a combination of stannic oxide and aluminum oxide. A method for manufacturing composite target material includes the steps of: providing a mixture made of titanium oxide power in a range between about 40 wt % and about 80 wt %, stannic oxide powder or aluminum oxide in a range between about 15 wt % and about 50 wt %, binder in a range between about 5 wt % and about 10 wt %; pressing the mixture to form a blank; sintering the blank; cooling the blank.

6 Claims, No Drawings

COMPOSITE TARGET MATERIAL AND METHOD FOR PRODUCING THE SAME

BACKGROUND

1. Technical Field

The present disclosure relates to a composite target material used in the sputter-production of a thin film and a method for producing such composite target material.

2. Description of Related Art

Physical vapor deposition (PVD) has been used to deposit thin films on glass or other substrates. Presently, magnetron sputtering is used for forming a coating in PVD technology. Magnetron sputtering is a process whereby atoms are ejected from a solid target due to bombardment of the target by energetic particles of a magnetron so that a film is formed on the glass or other substrate material. The film is required to have excellent transmission of light, hydrophobicity, and ultra-violet light resistant. However, current solid target material used for film material has a low utilization rate and does not satisfactorily fulfill these requirements.

Therefore, there is room for improvement within the art.

DETAILED DESCRIPTION

The exemplary embodiment provides a process of manufacturing composite target material used for coating a film on glass. The target material contains titanium oxide in a range between about 50 wt % and about 85 wt % and the remainder being stannic oxide or aluminum oxide or a combination of stannic oxide and aluminum oxide. The proportions of Titanium oxide powder, stannic oxide powder or aluminum oxide powder are determined by such factors as the desired properties of the film to be obtained by sputtering the composite target material. If the ratio of titanium oxide is higher than 85 wt %, this will effect hydrophobicity and ultra-violet light resistant of this film. If the ratio of titanium oxide is less than 50 wt %, the film produced by sputtering this target material will have stannic oxide or aluminum oxide in a high ratio and will causes a low transmission of light. In addition, this proportion allows stannic oxide to be evenly distributed on the film and make the target material to have a high utilization rate.

The process of manufacturing the composite target material may include at least the following steps:

Titanium oxide powder, stannic oxide powder or aluminum oxide powder, and binders are provided. In this exemplary embodiment, the titanium oxide powder is in a range between about 40 wt % and about 80 wt %. The stannic oxide powder is in a range between about 15 wt % and about 50 wt %. The binder is in a range between about 5 wt % and about 10 wt %. The titanium oxide power and stannic oxide powder are mixed with the binders to form a mixture. The titanium oxide powders have high purity in a range between about 97% and about 99%, the average size of granules in the powders ranges from 70 μm to 90 μm. The stannic oxide powders have high purity in a range between about 97% and about 99%, the average size of granules in the powders ranges from 70 μm to 90 μm. In other alternative embodiment, stannic oxide powder may be replaced with aluminum oxide powder. It is possible that a combination of stannic oxide and aluminum oxide is mixed with titanium oxide powder.

The binder is mixed with Titanium oxide powder, stannic oxide powder or aluminum oxide powder to form a mixture. The binder includes ethyl orthosilicate and organic solvent. The mass ratio of ethyl orthosilicate to the organic solvent is 1:10. After the mixture including the binder is sintered, ethyl orthosilicate and organic solvent will be burned off or volatile from the mixture. If the proportion of the ethyl orthosilicate is higher 1:10, during sintering the mixture including the binder, some ethyl orthosilicate might remain in the composite target material to reduce the utilization rate of the composite target material. The organic solvent may be ethanol or acetone.

The mixture is pressed into a blank. The pressing process is done at a material temperature from 100° C. to about 300° C. The pressing force is in a range from 100 tons to 200 tons.

The blank is sintered at a temperature in the furnace from about 900° C. to about 1800° C. for about 3 hours to about 4 hours. During the sintering process, the binders are removed from the powders and the individual metal powders metallurgically bond together as material diffusion occurs to remove most of the porosity left by the removal of the binders.

Finally, the mixture is cooled and becomes the finished target material.

The advantage of the process for producing the composite target material in accordance with the present disclosure and the resulting target material has sufficient strength and high relative density. In addition, this proportion of the target material contains titanium oxide in a range between about 50 wt % and about 85 wt % may allow the target material to have a high utilization rate.

It is believed that the present embodiments and their advantages will be understood from the foregoing description, and it will be apparent that different changes may be made thereto without departing from the spirit and scope of the disclosure or sacrificing all of its material advantages, the examples hereinbefore described merely being preferred or exemplary embodiments of the disclosure.

What is claimed is:

1. A method for manufacturing a composite target material comprising the steps of:
   providing a mixture made of titanium oxide power in a range between about 40 wt % and about 80 wt %, stannic oxide powder in a range between about 15 wt % and about 50 wt %, and binder in a range between about 5 wt % and about 10 wt %;
   pressing the mixture to form a blank;
   sintering the blank;
   cooling the blank;
   wherein the pressing step is at a material temperature from 100° C. to about 300° C., the pressing force is at a range from 100 tons to 200 tons.

2. The method of claim 1, wherein the titanium oxide powder has a purity in a range between about 97% and about 99%.

3. The method of claim 1, wherein the average size of the titanium oxide powder ranges from 70 μm to 90 μm.

4. The method of claim 1, wherein the binder includes ethyl orthosilicate and organic solvent, the mass ratio of ethyl orthosilicate to the organic solvent is 1:10.

5. The method of claim 4, wherein the organic solvent is ethanol or acetone.

6. The method of claim 1, wherein the blank is sintered at a temperature in the furnace from about 900° C. to about 1800° C. for about 3 hours to about 4 hours.

* * * * *